United States Patent [19]
Herman et al.

[11] Patent Number: 6,144,679
[45] Date of Patent: Nov. 7, 2000

[54] METHOD AND APPARATUS FOR PROVIDING A COHERENT TERAHERTZ SOURCE

[75] Inventors: Gregory S. Herman, Norfolk; Norman P. Barnes, Yorktown, both of Va.

[73] Assignee: Science Applications International Corporation, San Diego, Calif.

[21] Appl. No.: 09/232,169

[22] Filed: Jan. 15, 1999

[51] Int. Cl.[7] .................... G02F 1/39; H01S 3/10
[52] U.S. Cl. ................... 372/21; 372/22; 372/4; 250/504 R; 250/495.1
[58] Field of Search ................ 250/504 R, 493.1, 250/495.1, 338.1; 372/21, 22, 4; 359/326

[56] References Cited

U.S. PATENT DOCUMENTS 4,880,996  11/1989  Peterson et al. ................... 307/425

OTHER PUBLICATIONS

Kawase et al., "Coherent Tunable THz–wave Generation from LiNbO3 with Monolithic Grating Coupler". Appl. Phys. Lett., vol. 68, No. 18, (Apr. 29, 1996) p. 2483.

Herman et al., "Investigations of GaP for Terahertz Wave Generation using Quasi–phasematched Difference Frequency Mixing", Nonlinear Optics '98 Materials, Fundamentals and Applications Topical Meeting (Aug. 10–14, 1998), 1998 IEEE, pp30–32, Apr. 29, 1996.

Herman, et al., "Proposed system for a solid–state, tunable 2.5 Terahertz laser", pp. 1–5, postdeadline paper, Proceedings of the OSA/EEE Topical Conference on Nonlinear Optics, Wailea, Hawaii (1996).

Mark Fox, et al, Physical Review Letters, vol. 68, No. 14, Apr. 6, 1992, The American Physical Society; Coherent Submillimeter–Wave Emission from Charge Oscillations in a Double–Well Potential, pp. 2216–2219.

Edward D. Palik, Naval Research Laboratory, ISBN 0–12–544420–5, Handbook of Optical Constants of Solids, "Gallium Arsenide (GaAs)", pp. 429–464.

"Investigations of GAP for Terahertaz Wave Generation Using Quasi–phasematched Difference Frequency Mixing", Gregory S. Herman, Nonlinear Optics '98 Materials, Fundamentals and Applications Topical Meeting Aug. 10–14, 1998 IEEE Catalog #:98CH36244 Library of Congress #98–85597.

"Optoelectronic measurement of semiconductor surfaces and Interfaces with femtosecond optics", X.–C. Zhang and D.H. Auston, J. Appl. Phys. 71(1), Jan. 1, 1992.

"Optical and teraherz power limits in the low–temperature–grown GaAs photomixers", S. Verghese, K.A. McIntosh and E.R. Brown, Appl. Phys. Lett. 71 (19), Nov. 10, 1997.

"A wideband coherent terahertz spectroscopy system using optical rectification and electro–optic sampling", Ajay Nahata, Aniruddha S. Weiling, and Tony F. Heinz, App. Phys. Lett. 69 (16), Oct. 14, 1996.

"7 terahertz broadband GaP electro–optic sensor", Q. Wu and X.–C. Zhang, Appl. Phys. Lett. 70(14), Apr. 7, 1997.

"Coherent tunable Thz–wave generation from LiNbO$_3$ with monolithic grating coupler", Kodo Kawase, Manabu Sato, Tetsuo Taniuchi, and Hiromasa Ita, Appl. Phys. Lett, vol. 68 No. 18, Apr. 29, 1996.

(List continued on next page.)

*Primary Examiner*—Bruce C. Anderson
*Assistant Examiner*—Nikita Wells
*Attorney, Agent, or Firm*—Banner & Witcoff, Ltd.

[57] ABSTRACT

A coherent optical source, having a center frequency in the terahertz band can be generated. Two coherent optical sources of different frequencies can be mixed in a nonlinear crystal to generate an optical source having a third distinct frequency in the terahertz frequency range. The third frequency, an idler frequency, equals the difference between pump and signal wave frequencies incident on the crystal. The pump and signal wave frequencies are selected so that their frequency difference is in the terahertz range and so that the interaction between the pump, signal, and idler wave frequencies is phase matched using a cross-Reststrahlen band dispersion-compensated phasematching technique.

32 Claims, 9 Drawing Sheets

OTHER PUBLICATIONS

"Unidirectional radiation of widely tunable Thz wave using a prism coupler under noncollinear phase matching condition", Kodo Kawase, Manabu Sato, Koichiro Makamura, Tetsuo Taniuchi, and Hiromasa Ito, Appl. Phys. Lett. 71 (6), Aug. 11, 1997.

"Far Infrared Generation by $Co_2$ Lasers Frequencies Subtraction in A $ZnGeP_2$ Crystal" V.V. Appollonov, R. Bocquet, A. Boscheron, A.I. Gribenyukov, V. V. Korotkova, C. Rouyer, A. G.. Suzdal'tsev and Yu. A. Shakir, *International Journal of Infrared and Millimeter Waves,* vol. 17, No. 8, 1996.

"Generation of femtosecond electromagnetic pulses from semiconductor surfaces", Z.–C. Zhang, B. B. Hu, J. T. Darrow and D. H. Auston, *Appl. Phys. Lett.* 56(11), Mar. 12, 1990.

METHOD AND APPARATUS FOR PROVIDING A COHERENT TERAHERTZ SOURCE

FIELD OF INVENTION

The invention generally relates to the generation of a coherent optical source having its center frequency in the terahertz (i.e., far infrared) band. More particularly, the present invention is directed to providing a coherent terahertz source via three-wave optical mixing in nonlinear crystals using cross-Reststrahlen-band, dispersion compensated phasematching.

BACKGROUND OF INVENTION

Within the next decade, x-ray imaging systems will be replaced by imaging systems using terahertz frequency sources and detectors in areas such as medical, security and quality control applications. Terahertz frequency waves, or t-rays, can penetrate most solid substance like x-rays. In contrast to x-rays, t-rays are non-ionizing, and thus are non-lethal and safer for imaging applications. Further, t-ray systems produce true high resolution images rather than shadowy images produced by x-ray systems.

A heavy demand for terahertz technology also exists in the communications industry. Development of components necessary for a terahertz frequency heterodyne receiver will result in a dramatic increase in the available bandwidth in wavelength-division-multiplexed communications networks.

The terahertz band of the electromagnetic (E-M) spectrum exists between the mid-infrared band and the microwave band. Loosely defined, the terahertz band encompasses that part of the frequency spectrum that includes the frequencies ranging from about 0.3–10.0 terahertz (THz), or equivalently, the wavelengths ranging from about 1.0–0.03 millimeters. In the art, the terahertz band is also known as the far-infrared band or the submillimeter band.

The terahertz band is one of the last spectral regions to have compact, powerful, coherent sources available. Compact, high-performance t-ray systems, such as imaging and communication systems, need powerful, solid-state, pulsed and/or continuous-wave t-ray sources. Also, tunable, narrow-band, continuous-wave t-ray sources are necessary to produce high-performance terahertz frequency heterodyne receivers.

Until recently, only thermal incoherent optical sources emitted a significant amount of light in the far-infrared (FIR) or terahertz band of the frequency spectrum. Within the last few years, several types of FIR coherent optical sources have been developed for pulsed and continuous-wave applications. These FIR coherent optical sources include direct coherent sources (DCS), electronically-mixed electronic oscillators (EMEO), electronically-mixed optical oscillators (EMOO), and optically-mixed optical oscillators (OMOO). Each of these prior art optical sources methods has disadvantages.

DCS must support a resonant interaction between two energy levels spaced extremely close together because the FIR band is an extremely low energy band in comparison to the near-infrared and visible bands of the electromagnetic spectrum. Direct laser sources supporting the resonant interaction described are either vapor lasers or cryogenically cooled solid-state devices. Two types of DCS include the methanol laser and the heavy-hole light-hole laser.

The methanol laser is a gas laser pumped by another gas ($CO_2$) laser, and provides a moderate power level. However, when compared to a solid-state device that may have a similar output power, the methanol laser is inefficient, bulky, unreliable and difficult to maintain. Despite the drawbacks, the methanol laser remains in operation because a continuous-wave, solid-state device having a similar output power does not yet exist.

The heavy-hole light-hole laser is a solid-state laser in which the dominant transition between energy levels occurs between the heavy-hole band and light-hole band of a semiconductor. Since the transition between energy levels amounts to such a low energy, the laser crystal must be cryogenically cooled to prevent thermal electrons from adding spurious light to the output signal. Also, the output power of the heavy-hole light-hole laser is very low and will likely not increase substantially through further development.

Another method of producing a coherent light source uses electronically mixed electronic oscillators (EMEO). Employing a Gunn oscillator/multiplier, EMEO multiplies the frequency of a stable electronic oscillator using electronic mixers. Typically, the input frequency is multiplied by a factor of two or three in a single stage. To obtain the desired terahertz frequency from the fundamental oscillator frequency, many stages are required. However, such stages are inefficient and EMEO, to date, has been limited to frequencies less than 300 GHz.

Electronically mixed optical oscillators (EMOO) are a type of coherent terahertz source that is produced by mixing laser oscillators in photoconductors. Since the photon energy of a laser source must be greater than the band gap energy of the photoconductor, the laser excites electrons into the conduction band when the laser is incident on the photoconductor. The electrons in the conduction band (i.e., free carriers) cannot respond directly to the fundamental frequency of the incident laser, which is on the order of hundreds of terahertz. However, the free carriers can respond to frequencies on the order of tens of terahertz or less. Consequently, two distinct possibilities emerge, one for a narrow-band terahertz source and another for a broadband terahertz source.

A narrow-band terahertz source includes two narrow-band lasers. Each laser has a photon energy above the band gap energy of the photoconductor and a beat frequency, or frequency difference, as the terahertz frequency generated. The incident photons produce photoelectrons that respond to the beat frequency of the two incident lasers.

A broadband terahertz source includes one source laser having its photon energy above the band gap energy of the photoconductor to produce photoelectrons upon incidence. Rather than having two narrow-band lasers provide the necessary terahertz beat frequency, the one source laser has the necessary terahertz bandwidth to directly produce the terahertz frequencies to which the photoelectrons can and will respond. To achieve this operating capability, the broadband source employs lasers with sub-picosecond pulse lengths.

Presently, the broadband source, by mixing short-pulse (e.g., sub-picosecond pulse lengths) lasers in photoconductors, is far more developed than any narrow-band, continuous-wave source. This condition exists because the terahertz output power strongly depends on the peak power of the incident laser, and currently, the peak power of sub-picosecond lasers is much greater than the peak power of continuous-wave lasers. The most commonly used photoconductors for EMOO are III–V semiconductors, and in particular GaAs.

The broadband source method involves electronic rectification of sub-picosecond laser pulses. An extremely short laser pulse is incident on a photoconductor, and by design, the band gap energy of the photoconductor is less than the average photon energy in the incident laser pulse. The photon energy in the incident laser pulse excites electrons from the valence band of the photoconductor into its conduction band. Free carriers are generated instantaneously and the lifetime of the generated electron-hole pairs is much longer than the optical (i.e., laser) pulse length. Therefore, once generated, the free carriers can respond to the remaining electric field due to the incident optical pulse. The electric field accelerates the particles causing the particles to reradiate and rectify the terahertz bandwidth pulse. This creates a moderate amount of output power in the terahertz region. The output beam contains all the frequency components of the rectified optical pulse, and not merely the terahertz components. Unique to EMOO, a free space terahertz beam is produced, whereas other methods require coupling to an emitting antenna to obtain a free space beam.

A drawback of the broadband source method is that it is inherently self-limiting. The interaction in the semiconductor is limited to a length on the order of the far-infrared absorption length. The far-infrared absorption length limits the total mode volume, which directly affects the obtainable output power. However, doping increases the far-infrared absorption, thus reducing the far infrared absorption length, the interaction length, the mode volume, and ultimately the output power. This becomes a problem because the semiconductor must be doped with impurities to generate a sufficient number of free carriers when the optical pulse is incident.

Two narrow-band source methods exist. The methods include difference frequency mixing of continuous-wave diode lasers in 1) low-temperature-grown (LTG) GaAs photoconductors according to one method or 2) metal-semiconductor-metal, micro-structured GaAs photoconductors according to the other method. In both methods, the photon energies of the two lasers being mixed must be above the GaAs band gap.

The LTG GaAs photoconductor contains many impurity-associated electronic traps. When the optical fields are incident, the trap ensures that a photo-generated electron will be within a small distance of the photoconductor electrode. Consequently, there is a short transit-time from the point where the free carrier is created to the collection electrode, thereby allowing the device to respond to terahertz frequencies. However, this method is self-limiting because it attempts to drive a large current produced from the photo-generated electrons through a highly resistive nonlinear device, i.e., an LTG GaAs photoconductor with electronic traps. The output power is less than 0.5 microwatts when the device experiences thermal burnout at a diode laser pump power of about 100 milliwatts. Also, a coupling beam is required for a free space beam.

The method using metal-semiconductor-metal, microstructured GaAs photoconductors involves mixing two continuous wave lasers within metal-semiconductor-metal, microstructured photoconductors (MSMMP) using impurity-free GaAs. In contrast to the method using LTG GaAs, a small gap between the two electrodes where the photo-carriers are generated ensures a small transit time for the photo-carriers rather than the creation of traps in the photoconductor material to act as centers of photo-carrier generation. The MSMMP method is similar to the optical rectification method described above with two primary distinctions. In the MSMMP method, the incident lasers are narrow-band, continuous-wave diode lasers, which have a much lower intensity than the picosecond lasers employed in the rectification method. Also, the MSMMP method does not produce a free space beam and thus requires coupling to produce a free space terahertz beam. The MSMMP method has yet to be demonstrated and may suffer the same thermal burnout problem of the LTG GaAs method because both methods generate a large photocurrent over a short distance. However, the MSMMP device does not possess the traps associated with the LTG GaAs device, and may be less susceptible to thermal burnout. If so, the output power may continue to scale until incident lasers reach the optical damage threshold.

Another series of methods for coherent light source production employ optically mixed optical oscillators (OMOO). This field has been given the name of nonlinear optical frequency conversion and applies to any frequency conversion, up or down. The natural oscillation frequency of most solid-state lasers is much larger than 10.0 THz. Thus, for terahertz applications, down-conversion of solid-state laser oscillation frequencies is of primary interest. This nonlinear effect is referred to in the art as difference frequency mixing.

One OMOO method involves the rectification of sub-picosecond laser pulses in nonlinear optical crystals, which is similar to the EMOO rectification method described above. Although this method employs the same type of short pulse laser as a pump, and the nonlinear element is a semiconductor crystal, this rectification method differs in that the average photon energy is less than the band gap energy of the photoconductor. Thus, the incident laser energy does not excite electrons from the valence band of the photoconductor into its conduction band; rather the method utilizes the nonlinear optical properties of the crystal. As a nonlinear optical process, an efficient interaction requires velocity matching between the phase of the pulse and the phase of the generated terahertz wave. Velocity matching causes the coherence length of the interaction to be long. Group velocity matching of a pulse to a terahertz wave has been achieved in ZnTe using a single Ti:sapphire picosecond pulsed laser operating at approximately 0.800 micrometers as a pump source. As with the electronically mixed rectified short laser pulse, the output beam contains all the frequency components of the rectified optical pulse, and not merely the terahertz components. Also, this method produces a free space terahertz beam.

One of the disadvantages of this rectification method is that it uses only one laser for a pump source. For a wide-band terahertz source, the rectification method employing a single source cannot maintain a large coherence length over as wide a bandwidth as a three-wave mixed system with two slightly-frequency-separated input sources. Theoretically, the pulse bandwidth could be substantially widened, that is the pulse could be made even shorter. However, many problems would accompany such a modification. For example, constructing a shorter pulse pump laser would be extremely difficult and expensive. Also, as the pump pulse becomes shorter in time, the physical length of the pulse becomes smaller and synchronizing the entire optical system becomes extremely difficult. This leads to very small tolerances on optical alignment and timing. Further, since this method produces all frequency components, it is less efficient than a two input source system that produces only terahertz waves. Also, the rectification method cannot produce a narrow-band terahertz source.

Another type of OMOO involves three-wave mixing in nonlinear optical crystals. In a three-wave nonlinear interaction, the overwhelming consideration driving the efficiency of the interaction is the need for phasematching. Types of prior art phasematching techniques include birefringent phasematching, noncollinear phasematching, and quasi-phasematching.

Attempts to generate terahertz waves using birefringent phasematching in birefringent crystals were initiated in the 1970s using $CO_2$ and ruby lasers and various birefringent crystals, and abandoned until recently. Recently, terahertz waves were generated using birefringent crystals with a pulsed Nd:YAG laser. As a frequency converter element for generating terahertz waves, birefringent crystals have two main disadvantages.

Most important, birefringent crystals tend to absorb strongly in the far-infrared band of the spectrum due primarily to their many fundamental modes of vibration, which leads to a very wide Reststrahlen band. Although the cause of the far-infrared absorption is different, the end result is the same as the free electron absorption experienced by the photoconductors. The crystal absorbs much of the terahertz radiation that it converts.

Also, all birefringent crystals suffer from "walk-off". "Walk-off" refers to the phenomenon of double refraction in linear optics, and in both linear and nonlinear optics, birefringence of the crystal causes double refraction. In laymen's terms, the interacting pump and signal "beams" begin to separate in space causing the region of overlap of the two beams to shrink. Since the beams begin to separate, the conversion efficiency of the interaction shrinks as the beams travel through the length of the crystal. For purposes of analysis, the walk-off angle is defined and calculated which leads to the calculation of an effective interaction length. The effective interaction length is finite and can be quite small, depending on the birefringence of the crystal and the orientation of the crystal when oriented at the desired phasematching angle (i.e., depending upon how much of the birefringence of the crystal is needed to obtain the phasematching condition for the interaction).

The method of noncollinear phasematching obtains the phasematching condition by having the incident pump and signal wave sources with slightly different propagation directions in the nonlinear crystal. As a result, altering the angle of the projection of the wavevector along the phasematching direction can vary the length of the wavevector for a certain wavelength in a specific direction. Typically, noncollinear phasematching is reserved for nonlinear interactions in which a birefringent crystal is unavailable. Also, noncollinear phasematching can be used to increase the acceptance angle of the nonlinear crystal by judicious choice of the noncollinear angle. A disadvantage of noncollinear phasematching stems from the condition that the beams are noncollinear. Consequently, the beams will separate as they travel through the crystal and thus, the interaction length will be finite.

The method of quasi-phasematching obtains the phasematching condition by creating a periodic structure with the nonlinear material to compensate for any resultant phase mismatch between the interacting waves. In ferroelectric nonlinear crystals, the periodic structure can be created with a large electromagnetic pulse and a series of periodic electrodes on opposite crystal faces. In all other nonlinear crystals, the periodic structure can be created by literally "cutting and pasting". Specifically, the nonlinear crystal is cut into equal length pieces and both sides of each are optically polished. Next, every other piece is "flipped" (reoriented) 180 degrees around the axis of propagation. After polishing and reorientation, all the pieces are diffusion bonded back together with such precision that the new interfaces appear transparent to the interacting waves. A disadvantage of quasi-phasematching is the exorbitant manufacturing cost of creating the periodic structure.

In any nonlinear optical mixing technique, once the frequencies of the interaction have been chosen, the efficiency of transferring power from the input (infrared) frequency to the output (terahertz) frequency scales with three major contributing factors. The factors are 1) the intrinsic optical properties of the nonlinear crystal performing the frequency conversion process; 2) the optical intensities of the incident (infrared) light source (along with the optical damage threshold of the crystal); and 3) the length, within the nonlinear crystal, over which frequency conversion takes place. When compared to the EMEO and EMOO methods described, the OMOO method has the greatest potential for producing a powerful terahertz source because the performance of a bulk nonlinear crystal with respect to the first two factors far exceeds the performance of the nonlinear elements used in the EMEO and EMOO methods. However, the difficulty of maintaining an efficient conversion process over a sufficiently long length of crystal makes the OMOO method unattractive when compared to the EMEO and EMOO methods. In the OMOO method, since the nonlinear crystal does not absorb terahertz radiation, the length of the crystal is significantly impacted by the required phasematching condition that must be satisfied to achieve an efficient frequency conversion process.

Each of the above-described methods of providing a coherent optical terahertz source has drawbacks. Thus, there is a need for a compact, powerful, coherent terahertz source that does not suffer from the above drawbacks, and more particularly, a need for a phasematching technique that does not suffer from the disadvantages of the prior art phasematching techniques.

SUMMARY OF THE INVENTION

The present invention overcomes the aforementioned problems with an OMOO method by providing a novel phasematching technique for terahertz generation. The method of the present invention allows for a compact, powerful, coherent terahertz source that exceeds existing OMOO methods and can rival existing EMEO and EMOO methods.

According to the present invention, the generated terahertz radiation and the pump infrared radiation must be on opposite sides of a fundamental Reststrahlen absorption band of the nonlinear crystal being used. The present invention provides several advantages. For example, the excellent nonlinear properties and power-handling capabilities of the bulk nonlinear crystals used in the OMOO method of the present invention allow continuous-wave t-ray sources to be produced that are far more powerful than the continuous t-ray sources that can be produced according to the EMEO and EMOO methods. Also, the OMOO method using the new phasematching technique of the present invention produces a more powerful terahertz source than existing techniques used to generate a coherent terahertz source. Further, the present invention generates a coherent terahertz source at a lower production cost than any existing technique.

The present invention provides a method for generating a terahertz band electromagnetic wave using a nonlinear crystal having a Reststrahlen band of wavelengths including a fundamental Reststrahlen wavelength. The method includes the steps of generating a first coherent electromagnetic wave of a first center wavelength shorter than the fundamental Reststrahlen wavelength, generating a second coherent electromagnetic wave of a second center wavelength shorter than the fundamental Reststrahlen wavelength, and mixing in the nonlinear crystal the first electromagnetic wave with the second electromagnetic wave to generate a third coherent electromagnetic wave having a third center wavelength in a terahertz band. The third center wavelength is longer than the fundamental Reststrahlen wavelength.

The present invention also provides a method for determining a first center wavelength and a second center wavelength appropriate for mixing together in a nonlinear crystal to generate a terahertz band electromagnetic wave. The nonlinear crystal has a Reststrahlen band of wavelengths including a fundamental Reststrahlen wavelength. The method includes the steps of choosing a third center wavelength in a terahertz band, the third center wavelength being longer than the fundamental Reststrahlen wavelength, and determining a value of each of the first center wavelength and the second center wavelength such that each of the first and second center wavelengths is shorter than the fundamental Reststrahlen wavelength. Further, mixing a first coherent electromagnetic wave of the first center wavelength with a second coherent electromagnetic wave of the second center wavelength in the nonlinear crystal generates a third coherent electromagnetic wave of the third center wavelength.

The present invention also provides an apparatus for generating a terahertz wave using a nonlinear crystal having a Reststrahlen band of wavelengths including a fundamental Reststrahlen wavelength. The apparatus includes a first source for generating a first coherent electromagnetic wave at a first center wavelength shorter than the fundamental Reststrahlen wavelength, a second source for generating a second coherent electromagnetic wave at a second center wavelength shorter than the fundamental Reststrahlen wavelength, and a nonlinear crystal on which the first and second electromagnetic waves are incident, for mixing the first and second electromagnetic waves to generate a third coherent electromagnetic wave at a third center wavelength in a terahertz band, the third center wavelength being longer than the fundamental Reststrahlen wavelength.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

The present invention is discussed below with reference to the generation of a coherent optical source having a center frequency between 0.3 and 10 terahertz, or equivalently, having a wavelength between 1 and 0.03 millimeters. The generated source can be pulsed or continuous-wave and wide-band or narrow-band. Further, aspects of the present invention may be used as the primary optical source in a t-ray imaging system or the local oscillator in a terahertz frequency heterodyne receiver. The invention may be used in many applications including, but not limited to, security (e.g., remote inspection of packages enclosed in plastic, cardboard or fabric), mine detection (e.g. land surface metal-detector/imager in arid areas), quality control of semiconductor logic chips (e.g., remote inspection of metal content therein), and quality control of agricultural products (e.g., remote inspection of water content therein). Although the present invention is described with respect to the terahertz frequency band, not all aspects of the present invention are so limited and may be applied to other frequency bands with appropriate modification.

Figure 1:
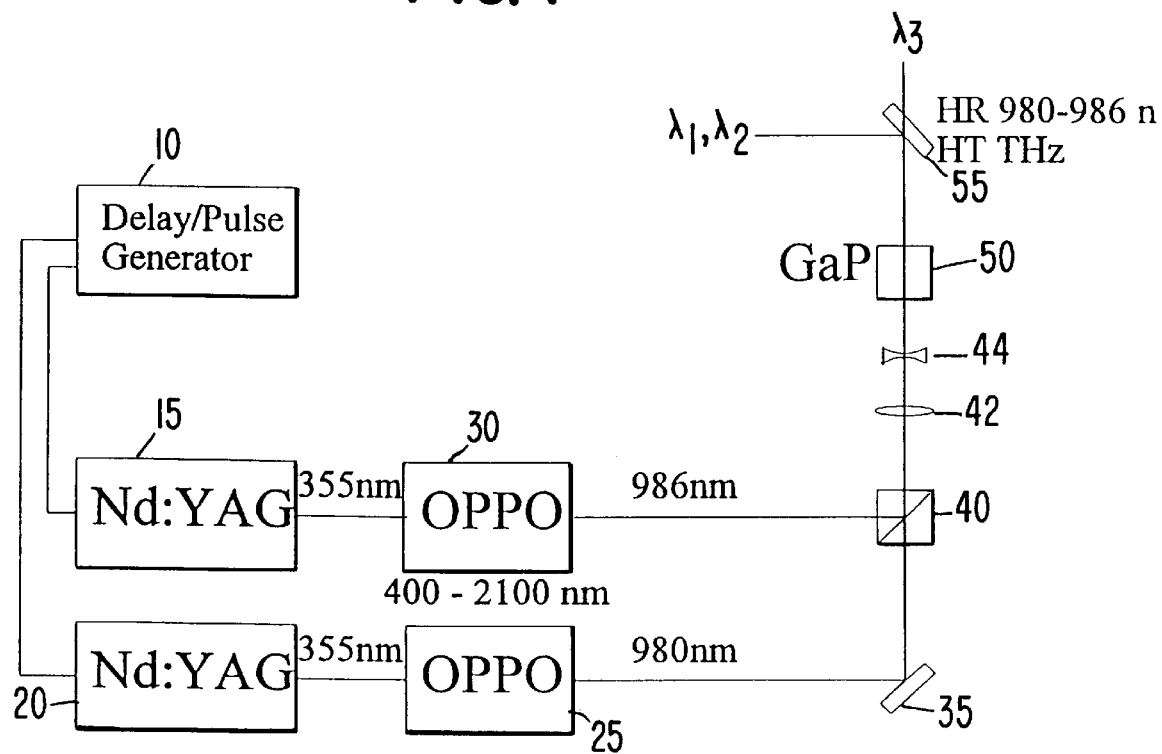
FIG. 1 shows an illustrative system for generating a terahertz source using pulsed laser sources according to the present invention.

FIG. 1 provides an illustrative pulsed terahertz generation system according to the present invention. A delay pulse generator 10, generates a pulse signal, which is supplied to two lasers, for example Nd:YAG lasers 15, 20. The delay pulse generator ensures the proper timing of the lasers 15, 20. The lasers 15, 20 generate coherent beams that may be of the same or different wavelengths. Alternatively, a single high-powered laser in combination with a beam splitter may be used to provide the two beams. According to the exemplary embodiment, the Nd:YAG lasers are Q-switched diode-pumped, solid-state lasers. The lasers 15, 20 are amplified to provide up to 500 mJ of infrared energy with a 3 ns pulse length. The frequency output of the lasers with a wavelength of 1.064 $\mu$m may be, e.g., tripled, so that the output beams have a wavelength, of 355 nm.

Next, each 355 nm beam passes through a respective frequency converter. In this illustrative embodiment, the respective 355 nm wavelength beams pump BBO-based optical power parametric oscillators (OPPO) 25, 30. The OPPOs are each tunable for wavelengths ranging from 400–2100 nm. The OPPO 25 frequency converts its 355 nm wavelength input to a pump wave of a first center wavelength $\lambda_1$ and center frequency ("the pump wave frequency ($\omega_1$)") and the other OPPO 30 frequency converts its 355 nm wavelength input to a signal wave of a second center wavelength $\lambda_2$ and center frequency ("the signal wave frequency ($\omega_2$)"). The pump and signal wave frequencies are chosen to be nearly equal so that they have a frequency difference in the terahertz frequency band. In the illustrative embodiment of FIG. 1, with an input beam of 355 nm, OPPO 25 generates a wavelength $\lambda_1$ ($\lambda_1$=980 nm) and OPPO 30 generates a wavelength $\lambda_2$ ($\lambda_2$=986 nm). Thus, the pump wave frequency is nearly equal to, but slightly greater than, the signal wave frequency. The frequency converting OPPOs 25, 30 are provided for generating many different combinations of pump and signal wave wavelengths. However, it should be understood that if a pair of lasers is used to generate only the desired specific pump and signal wave wavelengths, then the frequency converting OPPOs may not be necessary.

A mirror 35 diverts the wavelength $\lambda_2$ to a beam combiner/partial beam splitter 40. Beam combiner 40, which may be a polarizing beam splitter, receives and combines the pump wave and signal wave. Next, the combined pump and signal waves are incident on a nonlinear crystal 50.

Preferably, according to the present invention, the nonlinear crystal 50 is an isotropic nonlinear crystal, such as a GaP or GaAs crystal. Although birefringent crystals may be used, birefringent crystals tend to absorb terahertz radiation, and thus do not perform as well as isotropic crystals. Optionally, pump and signal waves may pass through optics, such as lenses 42, 44, to optimize their beam spot sizes. Lenses 42 and 44 may be configured to function as a telescope. The pump and signal waves mix in the nonlinear crystal 50. The output of the nonlinear crystal 50 includes three separate waves, the pump wave, the signal wave, and an idler wave of a center wavelength $\lambda_3$ and center frequency (the "idler wave frequency ($\omega_3$)"). Thus, the nonlinear crystal 50 functions as a frequency converter element.

The idler frequency represents the frequency difference between the pump wave frequency and the signal wave frequency, and has a value in the terahertz frequency range. The present invention uses a cross-Reststrahlen band compensated phasematching technique to ensure phasematching over a maximum coherence length. According to the technique, the pump, signal, and idler wave frequencies are each meticulously selected with respect to the absorption and dispersion properties, as well as the Reststrahlen band, of the nonlinear crystal 50. Specifically, the pump and signal wave frequencies are selected to be higher than the fundamental Reststrahlen or phonon frequency of the nonlinear crystal, and the idler wave frequency (i.e., the difference between the pump wave frequency and the signal wave frequency) is selected to be lower than the fundamental Reststrahlen frequency. Additionally, the pump, signal, and idler wave frequencies are selected such that the negative dispersion between the nearly equal pump and signal frequencies balances the positive dispersion across the Reststrahlen band between the pump and idler wave frequencies.

According to the illustrative embodiment of FIG. 1, the terahertz idler wave may be separated and used as terahertz source. The idler wave may be separated by, e.g., a filter 55 that receives the pump, signal, and idler waves output from the nonlinear crystal 50. The filter 55 can, for instance, be a beam splitter selected to be highly reflective for wavelengths in the near infrared region including wavelengths corresponding to the pump wave and signal wave, and highly transmissive in the terahertz range including wavelengths corresponding to $\lambda_3$. Thus, the filter 55 can filter out $\lambda_1$ and $\lambda_2$, while passing $\lambda_3$. Optionally, to verify that $\lambda_3$ is a terahertz wave, a thermal detector such as an InSb bolometer, can detect the wavelength and pass the wavelength to an oscilloscope.

Figure 2:
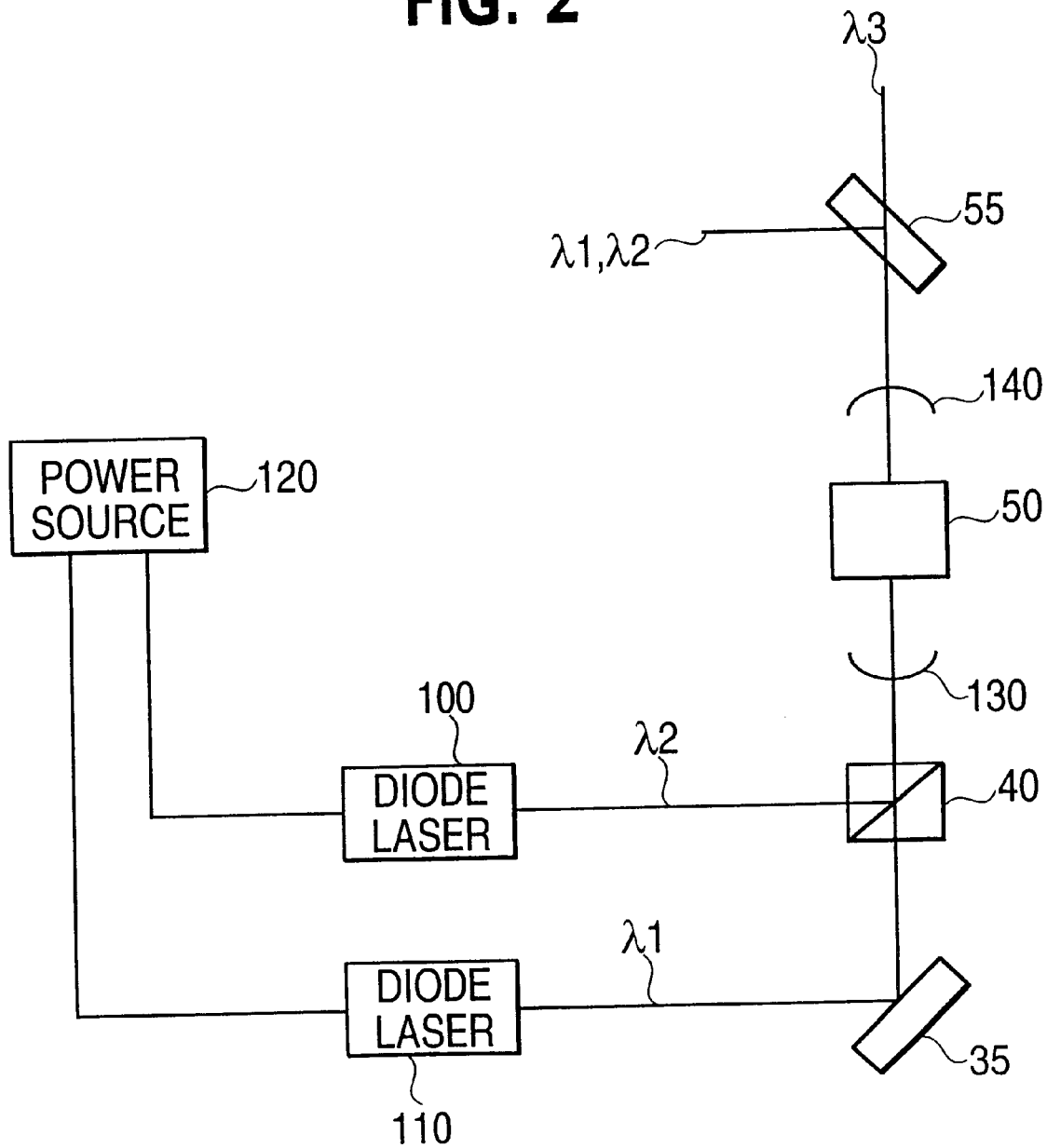
FIG. 2 shows an illustrative system for generating a terahertz source using continuous-wave laser sources according to the present invention.

According to the present invention, the pump and/or signal waves may instead be continuous waves. Referring to FIG. 2, in which all elements in common with FIG. 1 are identically labeled, one or both of the Nd:YAG lasers 15, 20 of FIG. 1 may be replaced with laser diodes 100, 110. However, any appropriate continuous-wave source may be used. The laser diode 100 generates a continuous signal wave and may be selected to output a continuous wave at for example, $\lambda_2$=986 nm, and the laser diode 110 generates a continuous pump wave and may be selected to output a continuous wave at, for example, $\lambda_1$=980 nm (although the appropriate frequencies should be chosen in accordance with the present invention). The laser diodes 100, 110 may be powered by a continuous power source 120. Because the powers of the pump and signal waves as output by the laser diodes 100, 110 are typically lower in a continuous-wave system than in the pulsed-wave system of FIG. 1, the intensity of the combined pump and signal waves within the nonlinear crystal 50 may need to be increased. To increase the intensity, a pair of curved mirrors 130, 140 may be disposed on either side of the nonlinear crystal, thereby effectively creating a reflective cavity within the nonlinear crystal 50 defined by the space between the pair of mirrors 130, 140. The curved mirrors 130, 140 may be spaced and/or otherwise configured such that the pump and signal waves can easily enter the nonlinear crystal 50 yet be repeatedly reflected within the crystal before exiting the nonlinear crystal 50 toward the filter 55. Thus, a continuous wave source may be generated using continuous wave pump and signal waves in a system having an external cavity surrounding the nonlinear crystal 50 that is frequency-locked to achieve a double resonance of the pump and signal waves. According to embodiments of the present invention that generate a continuous-wave terahertz band output, the output power may be on the order of 1 milliwatt or more. Further, the two continuous-wave laser sources may be frequency-locked together as is well known in the art using Pound-Drever-Hall frequency locking, thus providing two laser sources in which the frequency difference between the sources 100, 110 is extremely stable.

In further embodiments of the present invention, the terahertz idler wave may be a narrow-band or wide-band wave. For a narrow-band idler wave output, two narrow-band sources may be used to generate the pump and signal waves. For a wide-band idler wave output, a narrow-band pump wave source and a wide-band signal wave source, or a wide-band pump wave source and a narrow-band signal wave source, may be used. When generating a wide-band idler wave, the center wavelengths and the bandwidth of the narrow and/or wide-band pump waves and/or signal waves would be selected according to the present invention, such that the interaction in the nonlinear crystal 50 is phasematched for the desired center wavelength and bandwidth of the idler wave.

To mathematically understand the selection of the pump, signal and idler wave frequencies, the following, three-wave, nonlinear interaction is analyzed involving the pump wave at pump wave center frequency $\omega_1$, the signal wave at signal wave center frequency $\omega_2$ and the idler wave at idler wave center frequency $\omega_3$. The pump and signal waves are incident upon a nonlinear crystal of length L and $\omega_1 > \omega_2 >> \omega_3$.

The energy conservation law for this interaction is well known and is given by $$\hbar\omega_1 - \hbar\omega_2 = \hbar\omega_3 \text{ or } \frac{1}{\lambda_1} - \frac{1}{\lambda_2} = \frac{1}{\lambda_3} \tag{1}$$

The momentum conservation law is also well known and is given as, $$\hbar k_1 - \hbar k_2 = \hbar k_3 \text{ or } \frac{n_1}{\lambda_1} - \frac{n_2}{\lambda_2} = \frac{n_3}{\lambda_3} \tag{2}$$

where $n_i$ is the refractive index at the wavelength $\lambda_i$. The three-wave, nonlinear interaction is perfectly phasematched when equations (1) and (2) are solved simultaneously. Thus, to properly select the pump wave, signal wave, and idler wave center frequencies, the relationships represented by equations (1) and (2) must be met.

From (2), we define the phase mismatch, $\Delta k$, which we ultimately wish to set equal to zero.

$$\Delta k \cong 2\pi \left( \frac{n_1}{\lambda_1} - \frac{n_2}{\lambda_2} - \frac{n_3}{\lambda_3} \right) \tag{3}$$

For the case of difference frequency generation in which $\lambda_1 \approx \lambda_2 << \lambda_3$, we can make a substitution corresponding to a first order Taylor series approximation of the dispersion in the region of $n_1$ and $n_2$.

$$n_2 = n_1 + (\lambda_2 - \lambda_1)\frac{\Delta n}{\Delta \lambda} = n_1 + (\lambda_2 - \lambda_1)\frac{(n_2 - n_1)}{(\lambda_2 - \lambda_1)} \tag{4}$$

Substituting (4) back into (3), we get for the phase mismatch, $$\Delta k = 2\pi \left( \frac{n_1}{\lambda_1} - \frac{n_1 + (\lambda_2 - \lambda_1)\frac{(n_1 - n_1)}{(\lambda_2 - \lambda_1)}}{\lambda_2} - \frac{n_3}{\lambda_3} \right) \tag{5}$$

$$= 2\pi \left( n_1 \left(\frac{1}{\lambda_1} - \frac{1}{\lambda_2}\right) - \frac{(\lambda_2 - \lambda_1)\frac{(n_2 - n_1)}{(\lambda_2 - \lambda_1)}}{\lambda_2} - \frac{n_3}{\lambda_3} \right)$$

$$= 2\pi \left( \left[ \left(n_1 - \lambda_1 \frac{(n_2 - n_1)}{(\lambda_2 - \lambda_1)}\right) \left(\frac{1}{\lambda_1} - \frac{1}{\lambda_2}\right) \right] - \frac{n_3}{\lambda_3} \right)$$

Combining the energy conservation law (2) with (5), we find that the phase mismatch is $$\Delta k = \frac{2\pi}{\lambda_3} \left( n_1 - \lambda_1 \frac{(n_2 - n_1)}{(\lambda_2 - \lambda_1)} - n_3 \right) = \frac{2\pi}{\lambda_3} \left( n_1 + \frac{\lambda_3}{\lambda_2}(n_1 - n_2) - n_3 \right) \tag{6}$$

Equation (6) is an accurate estimate of the phase mismatch of this interaction. It shows that the phase mismatch is proportional to the idler vacuum wavenumber multiplied by a factor that—once the idler wavelength (or frequency) is selected—depends exclusively upon the pump wavelength and the properties of the crystal at the pump wavelength. With this realization, equation (6) may be examined in view of our knowledge of the dispersion characteristics of the crystal. For practical reasons, we consider only regions of the nonlinear crystal that are weakly absorbing. In addition, the generated idler frequency ($\lambda_3$ is lower than the nonlinear crystal's fundamental Reststrahlen frequency, while the pump and signal frequencies, $\lambda_1$ and $\lambda_2$, are much higher than the fundamental Reststrahlen frequency and on the other side of the Reststrahlen band. Therefore, we know that across the Reststrahlen band, the dispersion is positive between the pump and idler waves, i.e., $$n_1 < n_3; \; (\lambda_1 << \lambda_3) \tag{7}$$

We also know that above the Reststrahlen band, the dispersion is negative between the pump and signal waves, i.e., $$\frac{(n_2 - n_1)}{(\lambda_2 - \lambda_1)} < 0; \; (\lambda_1 < \lambda_2) \tag{8}$$

From equations (6)–(8), it follows that for the case of a Difference Frequency Generation (DFG) interaction using pump, signal, and idler wavelengths of $\lambda_1$, $\lambda_2$, and $\lambda_3$, respectively, and using the Cross-Reststrahlen band phasematching technique of the present invention, that $$n_2 < n_1 < n_3; \; (\lambda_1 < \lambda_2 << \lambda_3)$$

Thus, it is possible for the dispersion across the Reststrahlen band to balance the dispersion between the pump and signal frequencies. Therefore, the idler wavelength can be set and the pump wavelength that that sets the phase mismatch to zero can be searched for. The phasematching condition is $$n_1 + \frac{\lambda_3}{\lambda_2}(n_1 - n_2) = n_3 \tag{9}$$

Or equivalently, $$\frac{n_1 - n_3}{n_1 - n_2} = -\frac{\lambda_3}{\lambda_2} \tag{10}$$

In physical terms, equation (10) describes the condition in which the impedance of the crystal at the idler wave frequency matches the effective impedance seen by the beatnote or envelope of the pump and signal waves. Thus, the phase of the idler wave and the beatnote envelope are velocity-matched within the crystal. The physical description of this is most evident by inspection of the last step of equation (5). It should be noted that the phasematching condition holds true only for unique sets for pump and idler wavelengths $\lambda_1$ and $\lambda_3$, and that these wavelengths are unique for each nonlinear crystal according to its dispersion characteristics.

We know that in a vacuum, $$\frac{1}{\lambda_1} - \frac{1}{\lambda_2} = \frac{1}{\lambda_b} \tag{11}$$

where $\lambda_b$ represents the vacuum wavelength of the beatnote envelope between the pump and signal waves of wavelengths $\lambda_1$ and $\lambda_2$. From equation (5), the beatnote envelope "wave" sees an effective refractive index equal to $$n_b = n_1 - \lambda_1 \frac{(n_2 - n_1)}{(\lambda_2 - \lambda_1)} = n_1 + \frac{\lambda_b}{\lambda_2}(n_1 - n_2) \tag{12}$$

Therefore, the phase mismatch for the three-wave nonlinear interaction can be represented by $$\Delta k = 2\pi \left( \left[ \left(n_1 - \lambda_1 \frac{(n_2 - n_1)}{(\lambda_2 - \lambda_1)}\right)\left(\frac{1}{\lambda_1} - \frac{1}{\lambda_2}\right) \right] - \frac{n_3}{\lambda_3} \right)$$

$$= 2\pi \left( \frac{n_1 + \frac{\lambda_b}{\lambda_2}(n_1 - n_2)}{\lambda_b} - \frac{n_3}{\lambda_3} \right)$$

$$= 2\pi \left( \frac{n_b}{\lambda} - \frac{n_3}{\lambda} \right)$$

The interaction is perfectly phasematched when the beatnote wave and idler wave see the same impedance within the nonlinear crystal, and therefore travel with the same velocity through the crystal.

The coherence length (i.e., the distance that a beam remains coherent after it leaves its source), $l_c = \pi/\Delta k$, is obtained by substituting from (6) and is plotted in FIG. 3 below for several different near-infrared pump wavelengths. In the present invention, the coherence length is equivalent to the distance over which the beatnote wave and the idler wave travel at the same velocity within the nonlinear crystal.

$$l_c = \frac{\lambda_3}{2\left(n_1 + \frac{\lambda_3}{\lambda_2}(n_1 - n_2) - n_3\right)} \quad (14)$$

The refractive indices of the GaP crystal were calculated using a Sellmeier equation of the form below and whose coefficients are listed in Table 1. The coefficients were obtained by fitting measured refractive index data valid in the near-infrared and far-infrared regions—on both sides of the Reststrahlen band—to the Sellmeier equation. It may be noted that the infrared absorption peak obtained by curve fitting the refractive index data corresponds very well with the measured absorption peak.

TABLE 1

Sellmeier Coefficients of GaP and GaAs.

|  | A | B | C | D | E |
|---|---|---|---|---|---|
| GaP | 2.81479 | 6.27677 | 0.09116 | 2.05549 | 762.1311 |
| GaAs | 6.29779 | 4.57613 | 0.24007 | 2.12568 | 1307.092 |

$$n^2(\lambda) = A + \frac{B\lambda^2}{\lambda^2 - C} + \frac{D\lambda^2}{\lambda^2 - E}. \quad (15)$$

To generate a specific idler wave frequency, the phase-matching pump wave frequency is selected and the signal wave is detuned appropriately. In GaP, the calculations predict perfect phasematching using pump wavelengths of 0.965–1.000 micrometers to generate idler wavelengths of 100–500 micrometers, or equivalently, idler wave frequencies of 3.0–0.6 THz. In addition, assuming a maximum practical crystal length of 100 millimeters, the calculations predict a very large tuning range for a given pump wavelength.

Figure 3A:
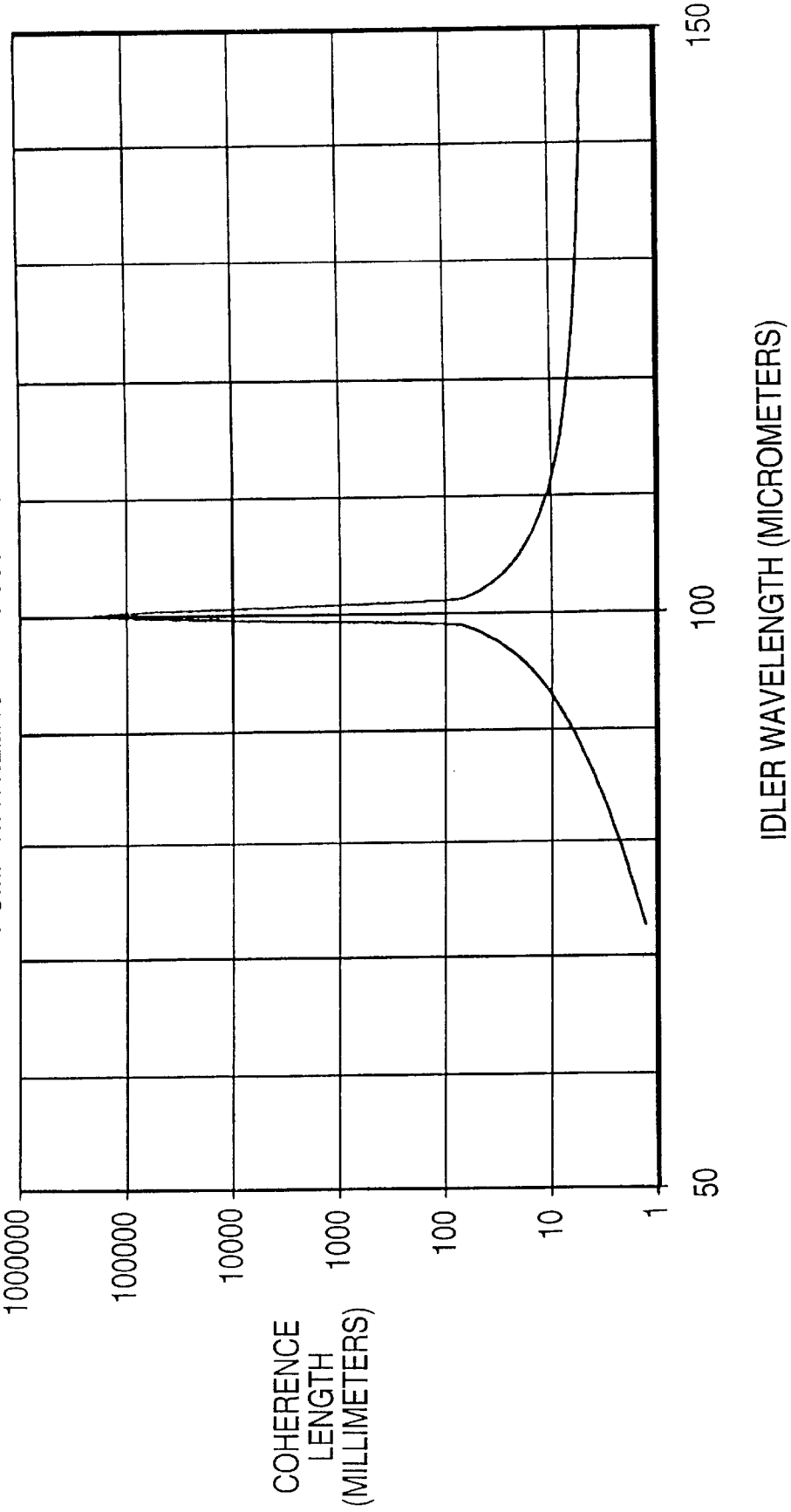
FIGS. 3A–3C shows graphs of coherence length versus idler wavelength in a GaP crystal for three different pump wavelengths according to an illustrative implementation of the present invention.
Figure 3B:
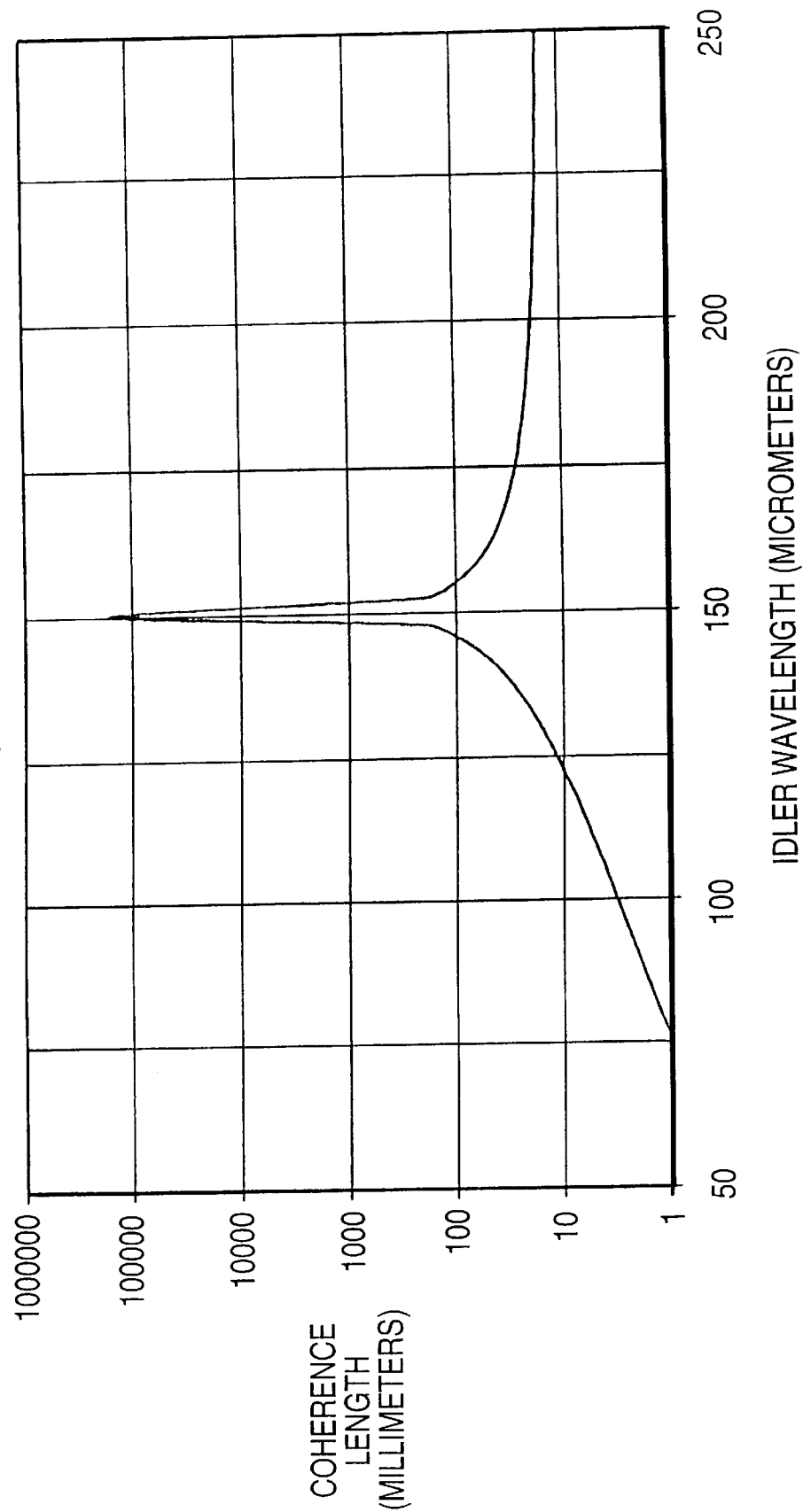
Figure 3C:
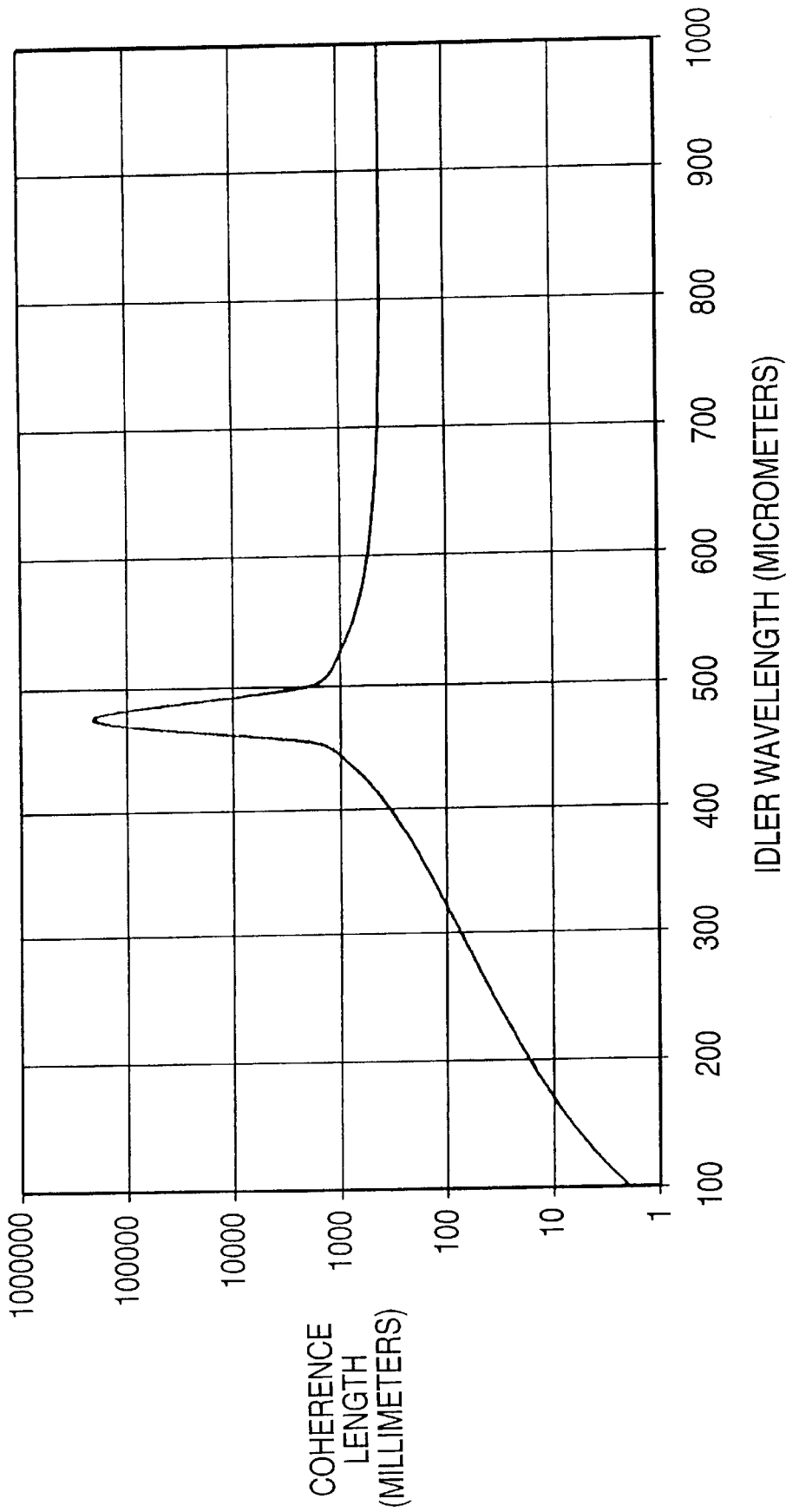

As shown in FIGS. 3A–3C, when GaP is pumped with a source wavelength of 0.965 micrometers, a tuning range of greater than +/−25 GHz is possible around the perfectly phasematched 3.0 THz frequency. When GaP is pumped with a source wavelength of 1.00 micrometers, the coherence length is at least 100 mm for a frequency range of greater than +/−300 GHz around the perfectly phasematched 630 GHz frequency.

Figure 4A:
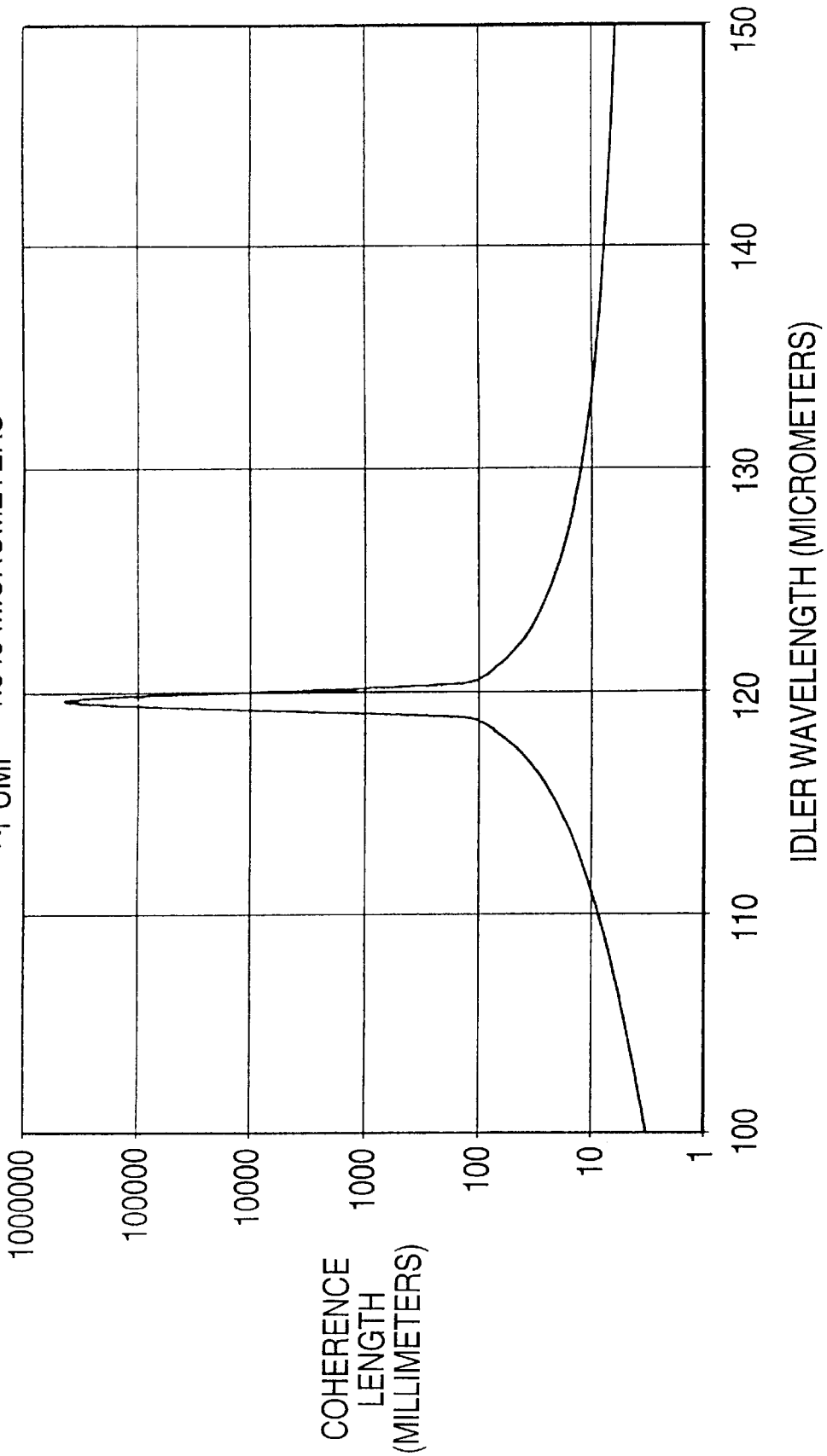
FIGS. 4A–4C shows graphs of coherence length versus idler wavelength in a GaAs crystal for three different pump wavelengths in an illustrative implementation of the present invention.
Figure 4B:
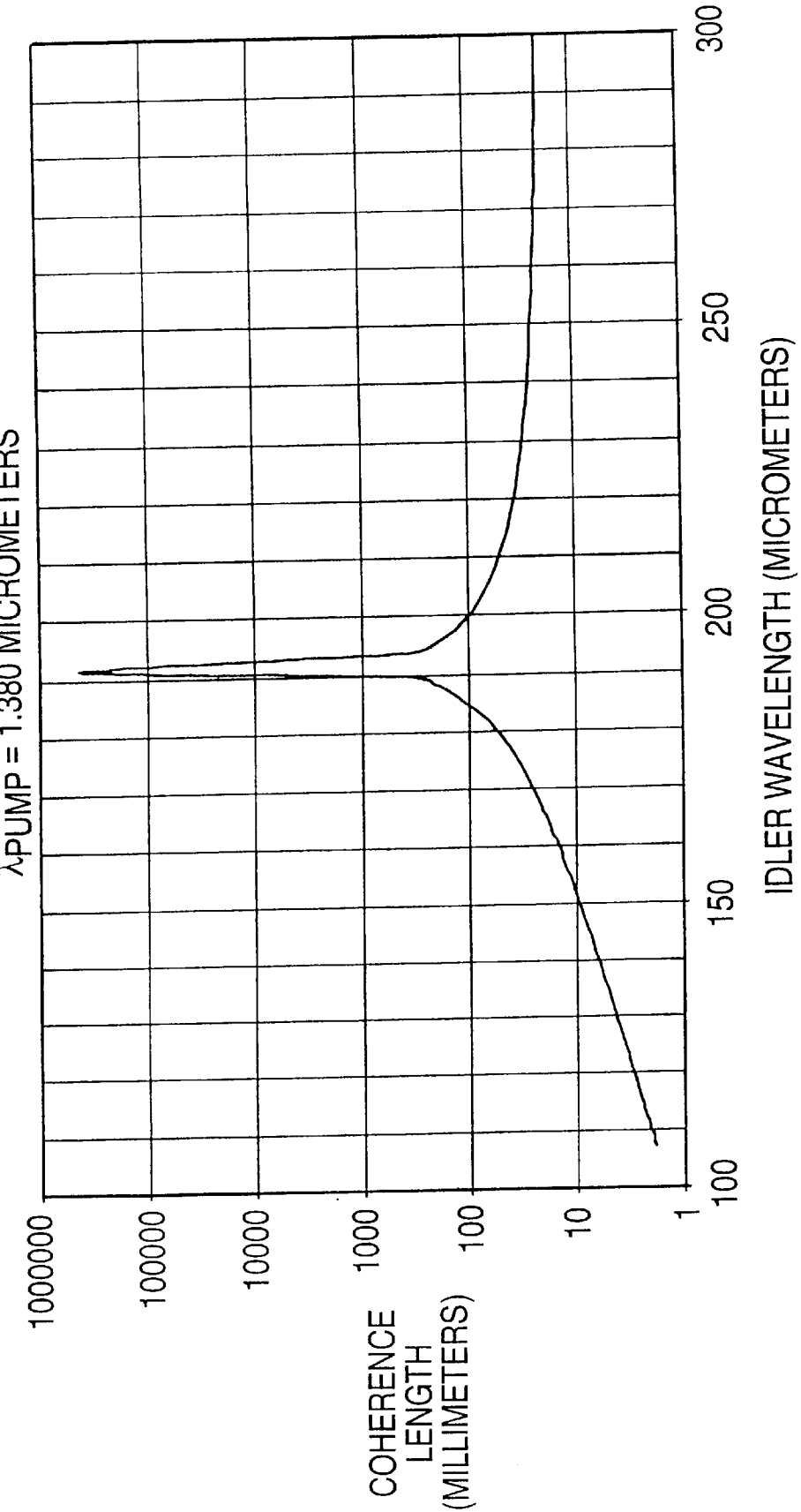
Figure 4C:
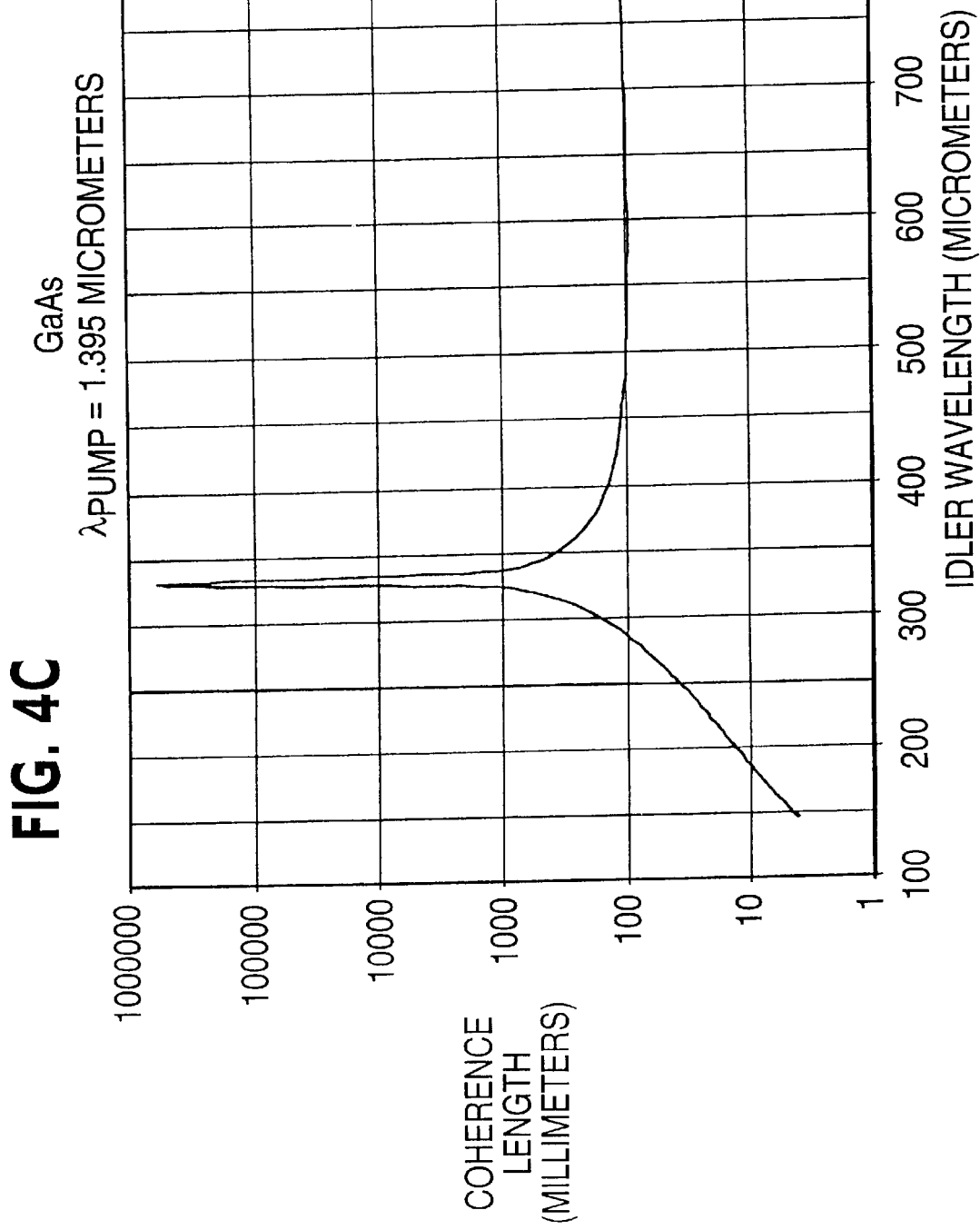

Similarly, in GaAs as shown in FIGS. 4A–4C, perfect phasematching is predicted when using pump wavelengths of 1.345–1.395 micrometers to generate idler wave frequencies from 2.5–0.9 THz with tuning ranges of 50 GHz to 1.0 THz, respectively. In FIGS. 4A–4C, the pump wavelengths were (a) 1.345 micrometers, (b) 1.380 micrometers and (c) 1.395 micrometers. In FIGS. 3A–3C and 4A–4C, the pump wavelength was actually resolved to the nearest picometer and the signal wavelength was incremented in steps of 100 picometers. While the pump wavelengths in FIGS. 3A–3C and 4A–4C can be tuned so that the peak coherence length is infinite, the infinite coherence length is not shown in the FIGS. 3A–3C and 4A–4C because the 100 picometer step size does not provide sufficient resolution to show this perfectly phasematched characteristic.

Difference Frequency Generation

For Difference Frequency Generation (DFG), we can use an analysis similar to that of the optical parametric amplifier in which the pump is not depleted, and where we instead concentrate on the newly generated idler wave rather than the amplified signal wave. For a phasematched interaction, the intensities of the signal and idler waves after traversing the crystal of length L are given by, $$I_2 = I_{20} \cosh^2 (\Gamma L)$$

$$I_3 = I_{20} \sinh^2 (\Gamma L) \quad (16)$$

We have defined the gain $\Gamma$ as, $$\Gamma^2 = \frac{8\pi^2 d_{eff}^2}{c\varepsilon_0 n_1 n_2 n_3 \lambda_2 \lambda_3} I_{10} \quad (17)$$

where, c is the speed of light $\varepsilon_0$ is the permittivity of free space $d_{eff}$ is the effective nonlinear coefficient $d_{eff} = d_{14} = 37$ pm/V $n_i$ is the refractive index of the nonlinear crystal at $\omega_i$, $\lambda_i$ is the free-space wavelength corresponding to $\lambda_i$, $I_{10}$ is the pump intensity incident on the nonlinear crystal, and $I_{20}$ is the signal intensity incident on the nonlinear crystal For $\Gamma L \ll 1$, equation (16) can be approximated by, $$I_2 = I_{20} \cosh^2 (\Gamma L) \Rightarrow I_{20}(1 + \Gamma^2 L^2)$$

$$I_3 = I_{20} \sinh 2 (\Gamma L) \Rightarrow I_{20} \Gamma^2 L^2 \quad (18)$$

Figure 5:
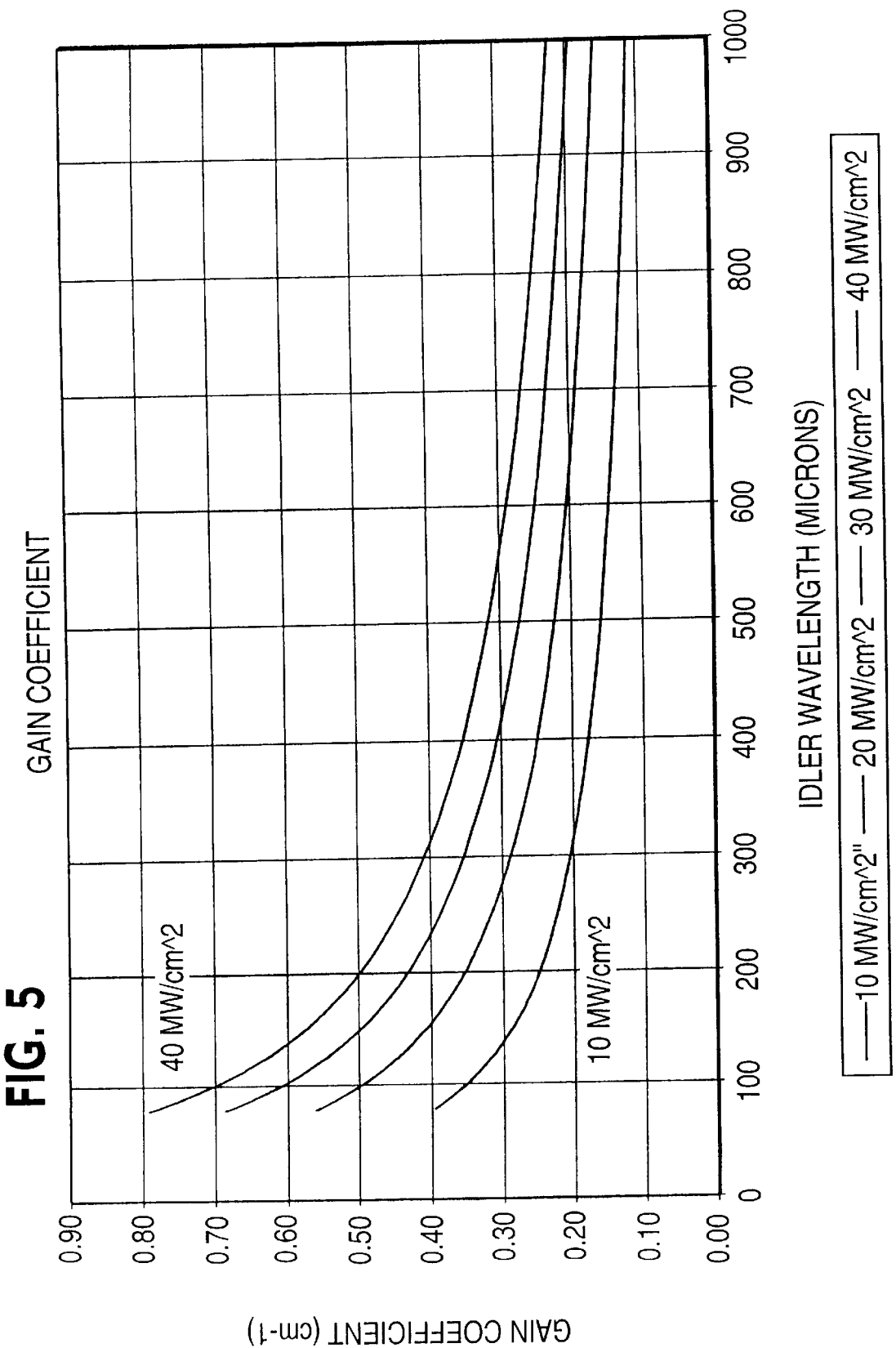
FIG. 5 shows the gain coefficient for difference frequency generation in a GaP crystal for several incident pump intensities according to an illustrative implementation of the present invention.

The gain factor has been calculated for several incident pump intensities for a pump wavelength of 1.000 micrometers, and is plotted in FIG. 5.

GaP Optical Properties

A nonlinear crystal operating under high NIR pump power conditions in a DFG interaction involving both the NIR and FIR bands must have the following material properties, in order of importance:

High Transmission at All Interaction Wavelengths (NIR, FIR)

High Damage Threshold

High Optical Quality

Large Nonlinear Susceptibility, ($d_{eff} > 1$ pm/V)

Large Size, (h, w, l>10 mm)

Small Spatial Walkoff

Wide Angular Acceptance Bandwidth

Noncritical Phasematching

Wide Spectral Acceptance Bandwidth

GaP is a cubic, III–V semiconductor crystal with a large nonlinear susceptibility ($d_{14} = 37$ pm/V). The band gap of GaP is in the Visible part of the spectrum ($\lambda_{cutoff} = 0.55$ micrometers), therefore, a GaP crystal with good optical quality will have a high transmission in the NIR. GaP is available in cylindrical boules that are larger than 50 millimeters in diameter and 75 millimeters in length. Because GaP is isotropic, GaP has zero spatial walkoff and will enjoy all of the benefits of noncritical phasematching.

The above described methods and apparatuses show that the pump and signal wave frequencies can be selected so that their frequency difference is in the terahertz range and so that the interaction between the pump, signal, and idler wave frequencies is phase matched using a cross-Reststrahlen band dispersion-compensated phasematching technique.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for generating a terahertz band electromagnetic wave using a nonlinear crystal having a Reststrahlen band of wavelengths including a fundamental Reststrahlen wavelength, the method comprising the steps of:
generating a first coherent electromagnetic wave of a first center wavelength shorter than the fundamental Reststrahlen wavelength;
generating a second coherent electromagnetic wave of a second center wavelength shorter than the fundamental Reststrahlen wavelength; and
mixing in the nonlinear crystal the first electromagnetic wave with the second electromagnetic wave to generate a third coherent electromagnetic wave having a third center wavelength in a terahertz band, the third center wavelength being longer than the fundamental Reststrahlen wavelength.

2. The method of claim 1, further including the step of selecting the first, second, and third wavelengths such that a negative dispersion caused by the nonlinear crystal between the first and second electromagnetic waves balances a positive dispersion caused by the nonlinear crystal between the first and third electromagnetic waves.

3. The method of claim 1, further including the step of selecting the first, second, and third center wavelengths such that each of the first, second, and third center wavelengths is outside of the Reststrahlen band, an absorption of each of the first, second, and third electromagnetic waves by the nonlinear crystal being relatively low.

4. The method of claim 1, wherein the nonlinear crystal has a first refractive index ($n_1$) at the first center wavelength ($\lambda_1$), a second refractive index ($n_2$) at the second center wavelength ($\lambda_2$), and a third refractive index ($n_3$) at the third center wavelength ($\lambda_3$), the method further including the step of selecting the first, second, and third center wavelengths such that the following equation is satisfied:

$$(n_1/\lambda_1)-(n_2/\lambda_2)=(n_3/\lambda_3).$$

5. The method of claim 1, wherein the nonlinear crystal is an isotropic crystal.

6. The method of claim 1, wherein the first and second electromagnetic waves are each continuous-wave waves.

7. The method of claim 1, wherein the first electromagnetic wave is a pulsed wave and the second electromagnetic wave is a continuous-wave wave.

8. The method of claim 7, wherein the first center wavelength is shorter than the second center wavelength.

9. The method of claim 1, wherein the third electromagnetic wave has a power of at least 1 milliwatt.

10. The method of claim 1, wherein each of the first and second electromagnetic waves is a narrow-band wave.

11. The method of claim 1, wherein each of the first and second electromagnetic waves is a wide-band wave.

12. The method of claim 1, wherein the first electromagnetic wave is a narrow-band wave and the second electromagnetic wave is a wide-band wave.

13. A method for determining a first center wavelength and a second center wavelength appropriate for mixing together in a nonlinear crystal to generate a terahertz band electromagnetic wave, the nonlinear crystal having a Reststrahlen band of wavelengths including a fundamental Reststrahlen wavelength, the method comprising the steps of:
choosing a third center wavelength in a terahertz band, the third center wavelength being longer than the fundamental Reststrahlen wavelength; and
determining a value of each of the first center wavelength and the second center wavelength such that each of the first and second center wavelengths is shorter than the fundamental Reststrahlen wavelength, and such that mixing a first coherent electromagnetic wave of the first center wavelength with a second coherent electromagnetic wave of the second center wavelength in the nonlinear crystal generates a third coherent electromagnetic wave of the third center wavelength.

14. The method of claim 13, further including the step of determining the first and second wavelengths such that a negative dispersion caused by the nonlinear crystal between the first and second electromagnetic waves balances a positive dispersion caused by the nonlinear crystal between the first and third electromagnetic waves.

15. The method of claim 13, further including the steps of:
choosing the third center wavelength such that the third center wavelength is outside of the Reststrahlen band, an absorption of the third electromagnetic wave by the nonlinear crystal being relatively low; and
determining the first and second center wavelengths such that each of the first and second center wavelengths is outside of the Reststrahlen band, an absorption of each of the first and second electromagnetic waves by the nonlinear crystal being relatively low.

16. The method of claim 13, wherein the nonlinear crystal has a first refractive index ($n_1$) at the first center wavelength ($\lambda_1$), a second refractive index ($n_2$) at the second center wavelength ($\lambda_2$), and a third refractive index ($n_3$) at the third center wavelength ($\lambda_3$), the step of determining further including determining the first and second center wavelengths such that the following equation is satisfied:

$$(n_1/\lambda_1)-(n_2/\lambda_2)=(n_3/\lambda_3).$$

17. The method of claim 13, wherein the step of determining includes the step of calculating the first and second center wavelengths based on an energy conservation law, a momentum conservation law, and a relationship between a refractive index of the nonlinear crystal and an incident wavelength.

18. The method of claim 17, wherein the step of calculating includes the step of calculating the first and second center wavelengths based on the third center wavelength, a first refractive index of the nonlinear crystal at the first center wavelength, a second refractive index of the nonlinear crystal at the second center wavelength, and a third refractive index of the nonlinear crystal at the third center wavelength.

19. An apparatus for generating a terahertz wave using a nonlinear crystal having a Reststrahlen band of wavelengths including a fundamental Reststrahlen wavelength, the apparatus comprising:
a first source for generating a first coherent electromagnetic wave at a first center wavelength shorter than the fundamental Reststrahlen wavelength;
a second source for generating a second coherent electromagnetic wave at a second center wavelength shorter than the fundamental Reststrahlen wavelength; and a nonlinear crystal on which the first and second electromagnetic waves are incident, for mixing the first and second electromagnetic waves to generate a third coherent electromagnetic wave at a third center wavelength in a terahertz band, the third center wavelength being longer than the fundamental Reststrahlen wavelength.

20. The method of claim 19, wherein a negative dispersion caused by the nonlinear crystal between the first and second electromagnetic waves balances a positive dispersion caused by the nonlinear crystal between the first and third electromagnetic waves.

21. The method of claim 19, wherein each of the first, second, and third center wavelengths is outside of the Reststrahlen band, an absorption of each of the first, second, and third electromagnetic waves by the nonlinear crystal being relatively low.

22. The apparatus of claim 19, wherein the nonlinear crystal has a first refractive index ($n_1$) at the first center wavelength ($\lambda_1$), a second refractive index ($n_2$) at the second center wavelength ($\lambda_2$), and a third refractive index ($n_3$) at the third wavelength ($\lambda_3$) such that the following equation is satisfied:

$$(n_1/\lambda_1)-(n_2/\lambda_2)=(n_3/\lambda_3).$$

23. The apparatus of claim 19, wherein the nonlinear crystal is an isotropic crystal.

24. The apparatus of claim 19, wherein the first and second electromagnetic waves are each continuous-wave waves.

25. The apparatus of claim 24, further including:

a first curved mirror in optical alignment with a first side of the nonlinear crystal, the first side of the nonlinear crystal being a side upon which the first and second electromagnetic waves are incident; and a second curved mirror in optical alignment with a second side of the nonlinear crystal, the second side of the nonlinear crystal being a side from which the third electromagnetic wave exits the nonlinear crystal, wherein a reflective cavity is formed between the first and second curved mirrors, the reflective cavity including at least a portion of the nonlinear crystal, the reflective cavity being frequency-locked to achieve double resonance of the first and second electromagnetic waves.

26. The apparatus of claim 24, wherein the first and second sources are locked together using Pound-Drever-Hall frequency locking.

27. The apparatus of claim 19, wherein the first electromagnetic wave is a pulsed wave and the second electromagnetic wave is a continuous-wave wave.

28. The apparatus of claim 27, wherein the first center wavelength is shorter than the second center wavelength.

29. The apparatus of claim 19, wherein the third electromagnetic wave has a power of at least 1 milliwatt.

30. The apparatus of claim 19, wherein each of the first and second electromagnetic waves is a narrow-band wave.

31. The apparatus of claim 19, wherein each of the first and second electromagnetic waves is a wide-band wave.

32. The apparatus of claim 19, wherein the first electromagnetic wave is a narrow-band wave and the second electromagnetic wave is a wide-band wave.

\* \* \* \* \*

UNITED STATES PATENT AND TRADEMARK OFFICE
CERTIFICATE OF CORRECTION

PATENT NO. : 6,144,679
DATED : November 7, 2000
INVENTOR(S) : Gregory Herman and Norman P. Barnes It is certified that error appears in the above-identified patent and that said Letters Patent is hereby corrected as shown below:

<u>Column 1,</u>
Line 4, insert the following:
-- The invention described herein was made in the perfomance of work under NASA contract no. NAS1-19570 and is subject to the provisions of section 305 of the National Aeronautics and Space Act of 1958, as amended (42 U.S.C. § 2457). --

Signed and Sealed this

Thirtieth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,144,679
DATED          : November 7, 2000
INVENTOR(S)    : Gregory Herman and Norman P. Barnes It is certified that error appears in the above-identified patent and that said Letters Patent is hereby corrected as shown below:

Column 1,
Line 4, insert the following:
-- The invention described herein was made in the perfomance of work under NASA contract no. NAS1-19570 and is subject to the provisions of section 305 of the National Aeronautics and Space Act of 1958, as amended (42 U.S.C. § 2457). --

Signed and Sealed this

Fourteenth Day of October, 2003

JAMES E. ROGAN
*Director of the United States Patent and Trademark Office*